(12) United States Patent
Regas et al.

(10) Patent No.: US 9,505,480 B2
(45) Date of Patent: Nov. 29, 2016

(54) AIRSHIP

(71) Applicant: A-NTE (AERO-NAUTIC TECHNOLOGY & ENGINEERING), Montrouge (FR)

(72) Inventors: Baptiste Regas, Nantes (FR); Adrien Regas, Nantes (FR); Olivier Jozan, Nantes (FR)

(73) Assignee: A-NTE (AERO-NAUTIC TECHNOLOGY & ENGINEERING), Montrouge (FR)

( * ) Notice: Subject to any disclaimer, the term of this patent is extended or adjusted under 35 U.S.C. 154(b) by 16 days.

(21) Appl. No.: 14/402,761

(22) PCT Filed: May 13, 2013

(86) PCT No.: PCT/FR2013/051038
§ 371 (c)(1),
(2) Date: Nov. 21, 2014

(87) PCT Pub. No.: WO2013/178904
PCT Pub. Date: Dec. 5, 2013

(65) Prior Publication Data
US 2015/0108270 A1     Apr. 23, 2015

(30) Foreign Application Priority Data
May 31, 2012  (FR) ..................... 12 55012

(51) Int. Cl.
*B64B 1/02*    (2006.01)
*B64B 1/62*    (2006.01)
*B64B 1/58*    (2006.01)

(52) U.S. Cl.
CPC . *B64B 1/62* (2013.01); *B64B 1/02* (2013.01); *B64B 1/58* (2013.01)

(58) Field of Classification Search
CPC ............. B64B 1/02; B64B 1/58; B64B 1/60; B64B 1/62
USPC ........................................ 244/24, 29, 30, 31
See application file for complete search history.

(56) References Cited

U.S. PATENT DOCUMENTS

| | | | | |
|---|---|---|---|---|
| 2,778,585 A * | 1/1957 | Tschudy | ................... | B64B 1/00 244/128 |
| 7,156,342 B2 * | 1/2007 | Heaven, Jr. | ............... | B64B 1/60 244/125 |

(Continued)

FOREIGN PATENT DOCUMENTS

| | | |
|---|---|---|
| CH | 698 134 B1 | 5/2009 |
| FR | 663009 A | 8/1929 |

(Continued)

OTHER PUBLICATIONS

French Search Report dated Jan. 28, 2013 for Application No. FR 1255012.

(Continued)

*Primary Examiner* — Richard G Davis
(74) *Attorney, Agent, or Firm* — Frost Brown Todd LLC

(57) ABSTRACT

An airship (1) comprising a flexible envelope (2), a wall (3) located inside the envelope, and a pumping device. The wall (3) extends longitudinally between the nose and the tail, thus separating the inside space of the envelope into a first space (E1) and a second space (E2), said second space being located on the periphery of the envelope between a first point (P1) and a second point (P2). The pumping device is adapted to inflate the second space so that the envelope assumes a second shape, and to deflate the second space so that the envelope assumes a first shape which is different from the second shape.

9 Claims, 4 Drawing Sheets

(56) References Cited

U.S. PATENT DOCUMENTS

| | | |
|---|---|---|
| 7,871,035 B2 | 1/2011 | Arel |
| 2005/0224638 A1 | 10/2005 | Goodey |
| 2010/0230533 A1* | 9/2010 | Greiner .................... B60V 3/08 244/97 |

FOREIGN PATENT DOCUMENTS

| | | |
|---|---|---|
| FR | 1 126 089 | 11/1956 |
| FR | 2 170 917 | 9/1973 |
| FR | 2927307 A1 | 8/2009 |

OTHER PUBLICATIONS

International Preliminary Report on Patentability dated Dec. 2, 2014 for Application No. PCT/FR2013/051038.
International Search Report dated Jul. 26, 2013 for Application No. PCT/FR2013/051038.

* cited by examiner

AIRSHIP

TECHNICAL FIELD

The invention relates to airships with a flexible envelope.

BACKGROUND INFORMATION AND PRIOR ART

More specifically, the invention concerns an airship comprising a flexible envelope without a rigid internal structure imposing a shape on the envelope, said envelope delimiting an inside space intended to be at least partially filled with a lighter-than-air first gas, extending along a longitudinal axis between a nose located at the front of the airship and a tail located at the rear of the airship, and comprising an upper portion located at the top and a lower portion located at the bottom, said lower portion being opposite the upper portion.

The lighter-than-air gas contained in an airship expands when the airship gains altitude, and conversely it contracts when the airship approaches the ground.

Airships with a flexible envelope typically comprise one or more ballonets inflated with air, said ballonets being housed inside the envelope of the airship. These ballonets are gas-tight bags, usually pressurized by fans which draw outside air into these ballonets. The air pressure in the ballonets directly exerts pressure on the light gas filling the rest of the inside space defined by the envelope. The shape of the envelope is thus kept substantially constant regardless of the altitude of the airship. This shape of the envelope, in a plane perpendicular to the longitudinal axis, is usually circular.

The disadvantage of these airships comprising ballonets is that it is necessary to increase the volume of the envelope quite significantly, for example by about 30%, to accommodate the ballonet(s) within the inside space of the envelope. In addition, the pressure in the ballonets must be regulated in order to maintain the outer shape of the envelope.

Airships also exist that have a flexible envelope of varying external shape. Document FR-A-0 663 009 describes an example of such an airship. It comprises stretchable tethers inside the envelope which connect several points of the envelope. As the tethers connect three or four points distributed within a plane transverse to the longitudinal axis of the airship, the airship has a three-lobed or four-lobed shape when it is close to the ground, and a more or less cylindrical shape when higher in altitude where the lighter-than-air gas expands and stretches the internal elastic tethers. This airship with a flexible envelope does not comprise internal ballonets, but the shape of its envelope changes with altitude.

The disadvantage of these airships is that their shape, which depends solely on their altitude, is not controlled.

BRIEF SUMMARY OF THE INVENTION

The aim of the present invention is to improve airships having a flexible envelope, and in particular to provide another solution for airships which allows modifying the shape of the envelope at will.

For this purpose, the airship is characterized by its additionally comprising:
a wall located inside the envelope, said wall being flexible, being gas-tight, extending longitudinally between the nose and the tail thus separating the inside space of the envelope into a first space intended to be filled with said first gas and a second space intended to be filled with a second gas, said second space being located on the periphery of the envelope between a first point and a second point of a perimeter within a plane perpendicular to the longitudinal axis, and
a pumping device adapted for inflating the second space to a control pressure greater than a pressure of the first space so that the envelope assumes a second shape by bringing the first and second points closer together, and for deflating the second space to a control pressure substantially equal to the pressure of the first space so that the envelope assumes a first shape that is different from the second shape.

By these arrangements, the pumping device is controlled in order to modify the pressure in the second space which can be inflated or deflated at will. This action of inflation or deflation modifies the shape of the internal wall which acts on the envelope of the airship by bringing the first and second points closer together or moving them further apart. The general shape of the outer envelope of the airship is thus modified.

In the second shape of the envelope, the volume of the inside space containing the lighter-than-air gas is reduced relative to the first shape of this envelope. The shape of the envelope can thus be adapted to the atmospheric pressure in which it is maneuvering.

In the second shape of the envelope, the airship is not as high and can be more easily introduced into a hangar. Hangars of very great height (exceeding 15-20 m) are very rare. It is then easier to find a suitable hangar. In addition, this second more flattened shape results in reduced envelope drag, and consequently a faster travel speed of said airship.

In various embodiments of the airship of the invention, one or more of the following arrangements may be applied.

In one aspect of the invention, the second space is delimited between a portion of the envelope and the wall, and the wall has a curvilinear length less than or equal to a curvilinear length of the portion of the envelope, in the plane perpendicular to the axis.

In one aspect of the invention, the first shape of the envelope has a cross-section in a plane transverse to the longitudinal axis which is circular, and the second shape of the envelope has a cross-section in this same transverse plane which comprises at least two lobes.

In one aspect of the invention, the wall has a curvilinear length in a plane perpendicular to the longitudinal axis which is equal to a distance between the first and second points of said envelope when the second space is deflated, and at a control pressure identical to the pressure of the first space.

In one aspect of the invention, the first and second points and the center of the envelope when the second space is deflated form an angle which is between 60 degrees and 100 degrees, and preferably between 70 degrees and 90 degrees.

In one aspect of the invention, the airship comprises a first wall and a second wall both located inside the envelope, said walls being flexible, being gas-tight, and extending longitudinally between the nose and the tail thus separating the inside space of the envelope into a first space intended to be filled with said first gas, and second and third spaces intended to be filled with a second gas, said first space being located between the second and third spaces, and said walls being placed symmetrically to each other relative to a vertical plane comprising the longitudinal axis when said second and third spaces are deflated.

In one aspect of the invention, the airship additionally comprises at least one internal ballonet inflated with air and adapted for pressurizing the first space, said internal ballonet being located inside the first space and not interacting with the envelope.

In one aspect of the invention, the pumping device is connected to the first space and to the second space in order to extract a quantity of the first gas from the first space to inject it into the second space in order to inflate the second space, or conversely in order to deflate the second space.

In one aspect of the invention, the pumping device is integrated into the wall inside the envelope of the airship.

In one aspect of the invention, the pumping device is connected to the outside of the envelope and to the second space in order to pump a quantity of the second gas from the outside the envelope and inject it into the second space in order to inflate the second space, or conversely in order to deflate the second space.

BRIEF DESCRIPTION OF THE DRAWINGS

Other features and advantages of the invention will be apparent from reading the following description of several embodiments, provided as non-limiting examples, with reference to the attached drawings.

In the drawings.

DETAILED DESCRIPTION OF EMBODIMENTS

In the various figures, the same references are used to denote the same or similar elements.

The forward direction mentioned in this description is to be understood as the direction heading in the direction X indicated in the figures. The backward direction is therefore in the opposite direction. Similarly, any mention of up or a top part is to be understood as the direction Z indicated in the figures. These directions are only mentioned to assist with reading and understanding the invention.

Figure 1:
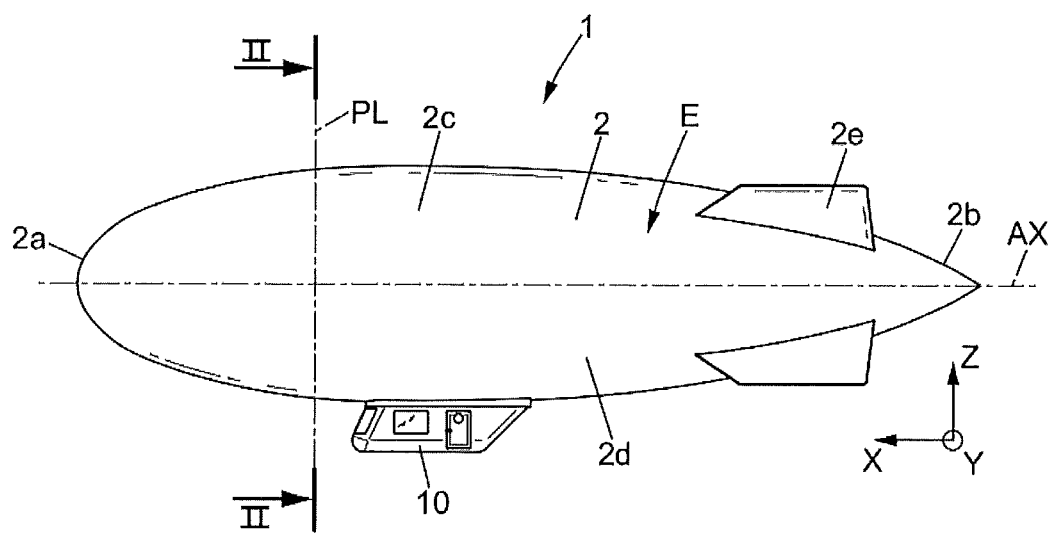
FIG. 1 is a longitudinal side view of the airship of the invention.

As can be seen in FIG. 1, the airship 1 comprises:
a flexible envelope 2 without a rigid internal structure and enclosing a first lighter-than-air gas,
a gondola 10, for example intended for transporting a pilot.

The envelope 2 delimits an inside space E relative to the outside space. The inside space E contains the lighter-than-air first gas for providing the lift force and for carrying the airship 1 upward. The outside space corresponds to the atmospheric environment in which the airship is traveling. The first gas (lighter than air) is, for example, hydrogen or helium, as is known. The lift force is an upward force exerted on the envelope which corresponds to a force known as buoyancy applied to the air displaced by the volume of the envelope 2 of the airship containing said lighter-than-air first gas:

$$\text{Buoyancy} = \rho \cdot g \cdot V$$

where
$\rho$ density of the air,
g acceleration due to gravity, and
V volume of air displaced.

This volume V is that of the envelope 2, without counting the volumes of the ballonets inflated with air. In other words, this is the volume occupied by the first gas.

The envelope 2 is substantially elongated along a longitudinal axis AX between a nose 2a located at the front of said airship and a tail 2b located at the back of said airship. The tail 2b comprises fins or a tail group 2e for ensuring directional stability in the flight of the airship. The flexible envelope 2 comprises an upper portion 2c at the top (above a substantially horizontal plane passing through the longitudinal axis AX) and a lower portion 2d at the bottom (below the horizontal plane passing through the axis AX).

The tail group 2e comprises depth and directional control surfaces for steering the airship. The gondola 10 is connected to the lower portion 2d of the envelope between the nose 2a and the tail 2b.

The invention relates to inflatable ballonets used to compensate for pressure variations with altitude. The first gas (lighter than air) contained in the airship expands when the airship rises in altitude, and conversely it contracts when the airship approaches the ground.

As mentioned in the introduction, ballonets are usually completely internal to the inside space delimited by the envelope 2 of the airship. Fans inflate these ballonets with air from outside the airship to compensate for the contraction of the gas at ground level, and progressively deflate them when the airship gains altitude and the lighter-than-air gas expands. The prior art airship equipped with ballonets thus maintains the general external shape of its envelope. The envelope maintains for example a circular cross-section. The ballonets of these airships have an envelope or wall which does not interact with the outer envelope of the airship. In particular, they are incapable of modifying the shape of this outer envelope of the airship.

Figure 2:
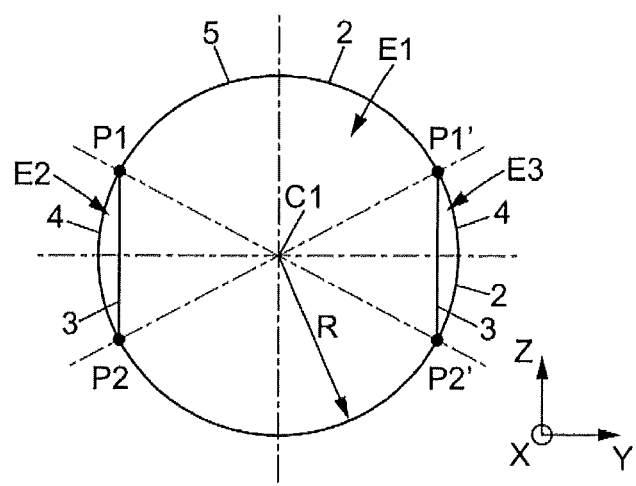
FIG. 2 is a transverse cross-sectional view of the airship of FIG. 1, in a first state of operation.
Figure 3:
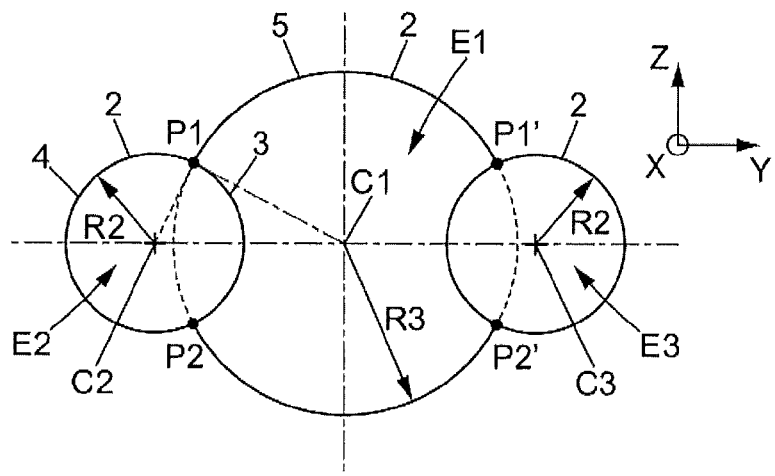
FIG. 3 is a transverse side view of the airship of FIG. 1, in a second state of operation.

In the invention, the airship comprises at least one specific ballonet which interacts with the outer envelope 2 of the airship, and which is illustrated in the cross-sections of FIGS. 2 and 3. This particular ballonet is formed by at least one wall 3 located inside the envelope 2. This wall 3 is flexible and gas-tight relative to the outer envelope 2. It is connected to it at a minimum of two points P1 and P2 as described below.

These two figures show an embodiment of the invention comprising two walls 3 each delimiting a space E2, E3 within the inside space E of the envelope 2. However, the airship may have only one wall 3 or any number of walls 3 distributed around the periphery of the envelope 2.

In a preferred embodiment of the invention represented in FIGS. 2 and 3, the airship comprises two walls 3 arranged vertically and symmetrically relative to the vertical plane XZ passing through the axis AX. The walls 3 extend longitudinally between the nose and the tail, separating the inside space E of the envelope 2 into a first space E1 filled with said first gas and second and third spaces E2, E3 intended to be filled with a second gas. In the rest of the description, only one of the spaces E2, E3 may be referred to, although the description equally applies to the other space.

FIG. 2 shows a cross-section of the airship 1 in a plane PL substantially parallel to the longitudinal axis AX of the airship, in a first state of operation corresponding to a higher altitude state in which the envelope 2 is circular in shape (second and third spaces deflated).

FIG. 3 shows the same cross-section of the airship 1 of the invention in a second state of operation corresponding to a state close to the ground, where the second and third spaces E2, E3 are inflated and the envelope 2 has a shape with three lobes ("tri-lobed"). The first lobe corresponds to the shape of the envelope 2 of the first space E1, and the second and third lobes correspond to the shapes of the envelope 2 of the second and third spaces E2, E3.

An airship which only comprises one wall 3 would therefore have a two-lobed shape in the second state, the number of lobes being one greater than the number of walls 3 of the airship.

The second space is therefore located on the periphery of the envelope 2, between a first point P1 and a second point P2 on a perimeter in a plane PL perpendicular to the longitudinal axis. In particular, a point C1, located at the center of the envelope in this plane PL (and positioned on the axis AX), is inside the first space E1, and is not in the second space E2. The third space E3 is respectively located on the periphery of the envelope 2 between another first point P1' and another second point P2', and without including the point C1 at the center of the first space.

The second space E2 is delimited by the wall 3 which has the shape of a straight line segment and by a portion of the envelope 4 which has the shape of an arc of a circle. The position of the points P1 and P2 is identified by the angle α formed by a horizontal line and a radius of the circle of the envelope 2 passing through the point P1. In the present embodiment, the points P1 and P2 are positioned symmetrically relative to said horizontal line.

The airship 1 of the invention additionally comprises a pumping device which is adapted to inflate the second space E2 to a control pressure PC that is greater than a first pressure PR1 of the first space E1 so that the envelope assumes a second shape as the first and second points P1, P2 draw closer together, as represented in FIG. 3 for example, and to deflate the second space E2 to a control pressure PC that is substantially equal to the pressure PR1 of the first space E1 so that the envelope assumes a first shape different from the second shape, said first shape corresponding for example to the shape in FIG. 2.

By these arrangements, the airship can change its external shape in flight. The envelope can thus change from the second shape to the first shape, and vice versa, by actuating the pumping device. This allows, for example, adapting the shape of the envelope to the atmospheric pressure and/or its altitude and/or its maneuvers (travel speed).

In FIG. 2, the envelope 2 has a first circular shape of radius R, imposed by the first pressure R1 which is greater than the atmospheric pressure PA (air) of the environment around the airship. The second space E2 (ballonet) is at a control pressure PC which is substantially equal to the first pressure PR1.

In FIG. 3, the envelope 2 has a tri-lobed second shape, imposed by the control pressure PC of the second space E2 being greater than the first pressure PR1 of the first space E1, the first pressure PR1 itself being greater than the atmospheric pressure PA (air) of the environment around the airship. The second space E2 thus is circular in shape with a radius $R_2$, while the first space has an external shape that is also circular, with radius $R_3$.

The atmospheric pressure PA is on the order of 1013 hPa (hectopascals).

The airship 1 will then have for example:
a first pressure PR1 of the first space E1 that is equal to the atmospheric pressure plus an excess pressure of between 200 Pa (pascals) and 1600 Pa, meaning:

$PR1=PA+(200 \text{ to } 1600 \text{ Pa})$, a control pressure PC of the second space E2 equal to the first pressure PR1 plus more excess pressure of between 200 Pa (pascals) and 1600 Pa, meaning:

$PC=PR1+(200 \text{ to } 1600 \text{ Pa})$.

It is ensured that the control pressure PC is greater than the first pressure PR1, which is itself greater than the atmospheric pressure PA.

The envelope 2 and the walls 3 consist of a flexible but non-stretchable material. The tri-lobed geometry of FIG. 3 is then imposed by the curvilinear lengths of FIG. 2.

Figure 6:
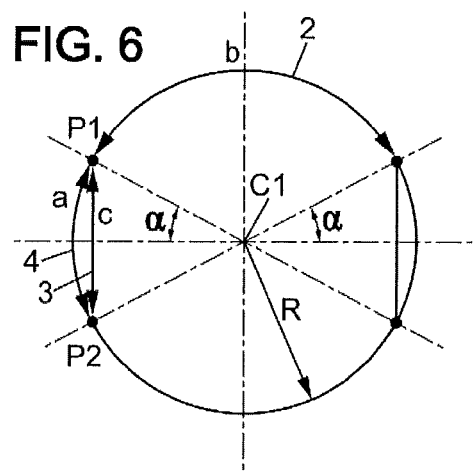
Figure 7:
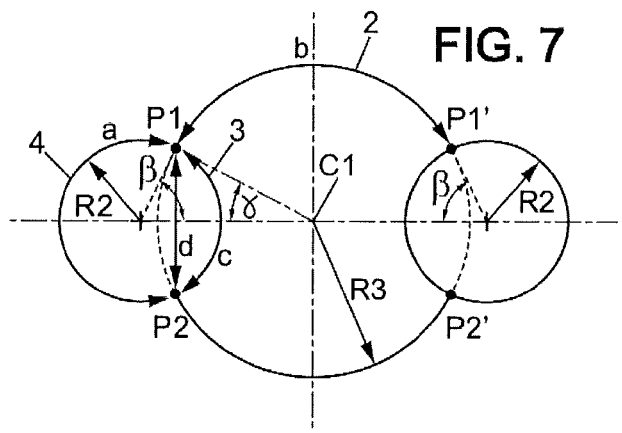

For better readability, these definitions of lengths and distances have been indicated in FIGS. 6 and 7, which respectively correspond to FIGS. 2 and 3.

The tri-lobed geometry can be determined for example by the calculations described below, or by any other numerical method using a computational tool based on a geometrical scheme.

The following lengths or distances are defined:
a is the curvilinear length of the portion 4 of the envelope 2 between points P1 and P2,
b is the curvilinear length of the complementary portion 5 of the envelope 2 between the two points P1 and P1',
c is the curvilinear length of the wall 3 in FIG. 6, which in the embodiment presented corresponds to the distance between the first and second points P1, P2, and
d is the distance between the points P1 and P2 in FIG. 7; and The following angles are defined:
α is the angle between the radius of the first space E1 passing through the point P1 and the horizontal line in FIG. 6,
β is the angle between the radius of the second space E2 passing through the point P1 and the horizontal line in FIG. 7, and
γ is the angle between the radius of the first space E1 passing through the point P1 and the horizontal line in FIG. 7.

In FIG. 6, we have the following equations:

$$a = R \cdot 2 \cdot \alpha \qquad (1)$$

$$b = R \cdot (\pi - 2 \cdot \alpha) \qquad (2)$$

$$c = R \cdot 2 \cdot \sin \alpha \qquad (3)$$

In FIG. 7, we have the following equations:

$$a = R2 \cdot 2 \cdot (\pi - \beta) \qquad (4)$$

$$b = R_3 \cdot (\pi - 2 \cdot \gamma) \qquad (5)$$

$$c = R_2 \cdot 2 \cdot \beta \qquad (6)$$

$$d = R_2 \cdot 2 \cdot \sin \beta = R_3 \cdot 2 \cdot \sin \gamma; \qquad (7)$$

Resolving these equations results in an equation of the type:

$$R \cdot \frac{(\alpha + \sin\alpha)}{\pi} \cdot \sin\beta = R \cdot \frac{(\pi - 2 \cdot \alpha)}{(\pi - 2 \cdot \gamma)} \cdot \sin\gamma$$

which allows determining the angle γ of FIG. 7 for any angle α of FIG. 6. All other variables of equations (1) to (7) can then be determined as a function of the radius R of the envelope 2 of FIG. 6.

The wall 3 as defined by the invention allows reducing the transverse surface area of the envelope 2 in the configuration of FIG. 7 (tri-lobed envelope).

The surface area of the cross-section of the envelope 2 in FIG. 6 is denoted $S_a$, and the surface area of the cross-section of the envelope 2 in FIG. 7 is denoted $S_b$. These surface areas correspond to the surface area in the plane PL of the inside space E, or in other words to the spaces E1, E2, and E3.

We then have the following values for these surface areas:

$$S_a = \pi \cdot R^2, \text{ and}$$

$$S_b = R_3^2 \cdot (\pi - 2 \cdot \gamma + 2 \cdot \cos\gamma\sin\gamma) + R_2^2 \cdot (2 \cdot \pi - 2 \cdot \beta + 2 \cdot \cos\beta\sin\beta).$$

Figure 4:
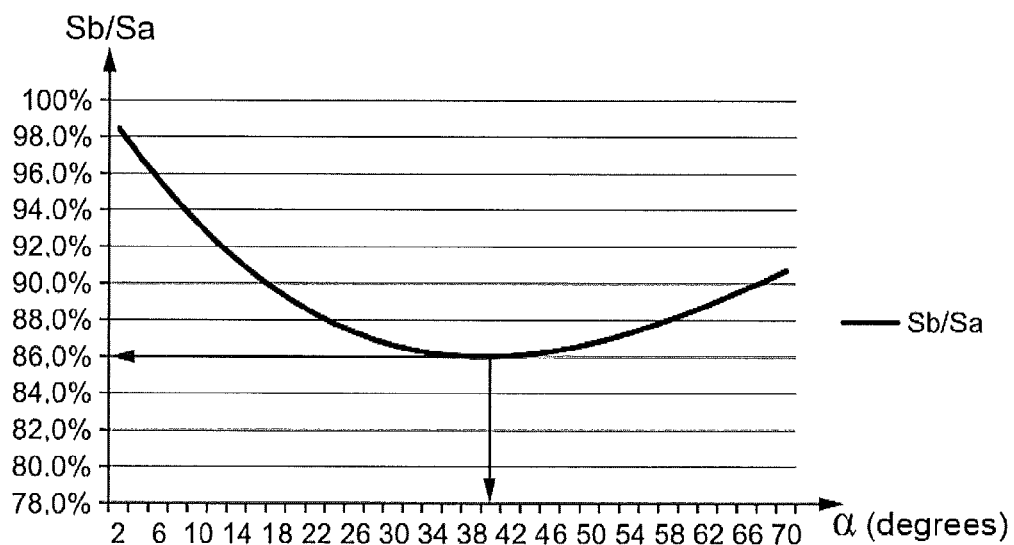
FIG. 4 is graph representing a variation in the surface area of the airship of FIG. 1 as a function of an angle which is a construction parameter of this airship.

By using the above equations, it is possible to show that the ratio $S_b/S_a$ is a function of only the angle α. This ratio is graphed in FIG. 4. This ratio is at its minimum for an angle value α of between 20 degrees and 60 degrees. Within this range of values, the ratio of the surface areas $S_b/S_a$ is decreased by 12%. If the value of the angle α is between 35 degrees and 45 degrees, the ratio of the surface areas $S_b/S_a$ is even closer to the minimum, and is decreased by 14%.

In other words, the first and second points P1, P2 and the center of the envelope C1 when the second space E2 is deflated form an angle which is twice the angle α of the calculation presented above. If this angle is between 40 degrees and 120 degrees, a decrease of 12% is obtained in the ratio of the surface areas, and if this angle is between 70 degrees and 90 degrees, an improved increase of 14% is obtained.

With these ranges for the variation of the angle α, said angle being a construction parameter of the airship of the invention, the variation in surface area is optimal. In this manner a decrease of 14% in said surface area can be obtained in the second state of operation (second and third spaces deflated). It is therefore possible to reduce the volume of the envelope 2 to the same proportions.

The height of the airship 1 (distance between the extreme points of the envelope 2 in the direction Z) is thus smaller in the second state of operation (FIG. 3) than in the first state of operation (FIG. 2). The height of the airship is thus reduced by 16%, which facilitates introducing the airship 1 into a hangar on the ground. Such hangars are more common and less costly.

Figure 5:
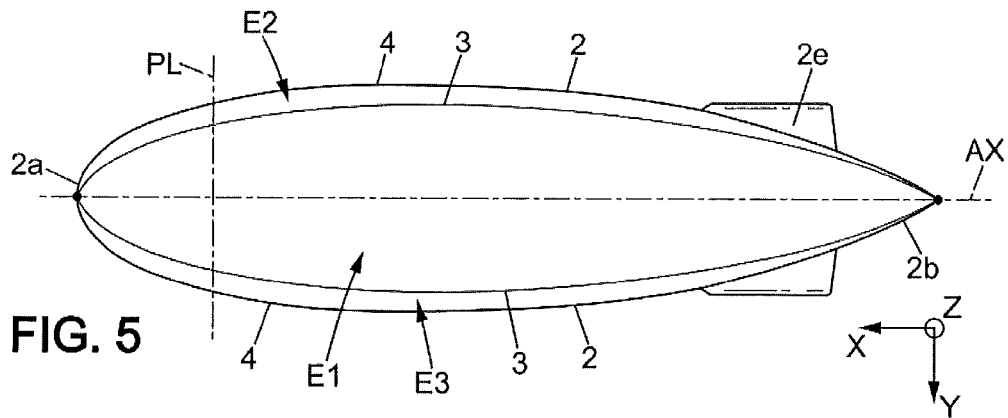
FIG. 5 is a longitudinal cross-sectional view of the airship of FIG. 1, and FIGS. 6 and 7 are cross-sectional views that are equivalent to FIGS. 2 and 3, showing the definitions of the distance, curvilinear lengths, and angles of the elements of the airship of FIG. 1, FIGS. 8 and 9 are cross-sectional views that are equivalent to FIGS. 2 and 3, corresponding to another embodiment of the airship of FIG. 1.

FIG. 5 represents a longitudinal cross-section of the airship 1 which shows that the wall 3 extends longitudinally between the nose 2a of the airship and the tail 2b of the airship.

The elements of the airship of the invention advantageously have a shape, in a cross-section along a transverse plane PL, which maintains equivalent proportions regardless of the longitudinal position of this plane between the nose and the tail of the airship. In particular, the angle α of construction of the geometry, as defined above, is advantageously constant longitudinally. The variation in surface area obtained by the ratio $S_b/S_a$ therefore implies an identical variation in the volume of the space E of the envelope 2.

The second space E2 between the portion 4 of the envelope 2 and the wall 3 therefore extends over a large distance. The variation in volume that can be achieved with the second space E2 is related to the distance between the nose and the tail. This variation in volume is thus very large, and the airship 1 of the invention is adapted to cause the volume occupied by the first gas (lighter than air) to vary according to the ratio variation as calculated above.

In the embodiment of the invention presented, the wall 3 has a curvilinear length c in a plane perpendicular to the longitudinal axis that is equal to a distance between the first and second points P1, P2 of said envelope when the second space is deflated to a control pressure PC substantially equal to the pressure of the first gas in the first space E1 (first state of operation of FIG. 2). We thus have the following relation:

$$c = \text{distance}(P1, P2)_{PC=PR1}.$$

In this embodiment, the wall 3 lies taut inside the envelope 2 when this envelope has a circular shape and the second space is deflated.

By this arrangement, as soon as the second space is inflated to a control pressure PC greater than the first pressure PR1 of the first space E1, the wall 3 is reshaped into an arc curving inwardly inside the airship 1 and the first and second points P1, P2 are drawn closer together. The wall 3 therefore immediately interacts with the envelope 2 as soon as the inflation of the second space E2 begins.

In a variant of this embodiment, the wall 3 can have a curvilinear length c greater than said distance between the first and second points of FIG. 2. Thus one has the following relation:

$$c > \text{distance}(P1, P2)_{PC=PR1}.$$

In this case, the envelope 2 does not deform as much and the obtained variation in volume is smaller. However, points P1 and P2 can also draw closer together when the second space E2 is inflated.

Advantageously, the wall 3 has a curvilinear length that is less than or equal to the curvilinear length of the portion 4 of the envelope 2. This provides the following relation:

$$c <= a.$$

In all the above cases, the variation in the ratio remains significant, for example greater than 10%, between the first and second states of operation of the airship.

The wall 3 may also have a curvilinear length c greater than the curvilinear length of the portion 4. In this case, however, the variation in the ratio is not expected to be as great.

The wall 3 may have a curvilinear length c substantially equal to the curvilinear length a of the portion 4, meaning equal to more or less ten percent (+/−10%) of the curvilinear length a. In this case, the variation in the ratio remains significant. It is therefore advantageous to have $c <= 1.1 \times a$.

The wall 3 may therefore have a curvilinear length c that is different from the distance between the points P1 and P2 of FIG. 2, while maintaining an effect on the envelope 2 which draws said first and second points P1, P2 closer together when the second space is inflated.

In the embodiment presented in FIGS. 1 to 7, the first and second points P1, P2 are placed symmetrically relative to a horizontal plane XY.

In this manner, the airship has minimal height in the vertical direction Z in the second state of operation of FIG. 3 (inflated).

Figure 8:
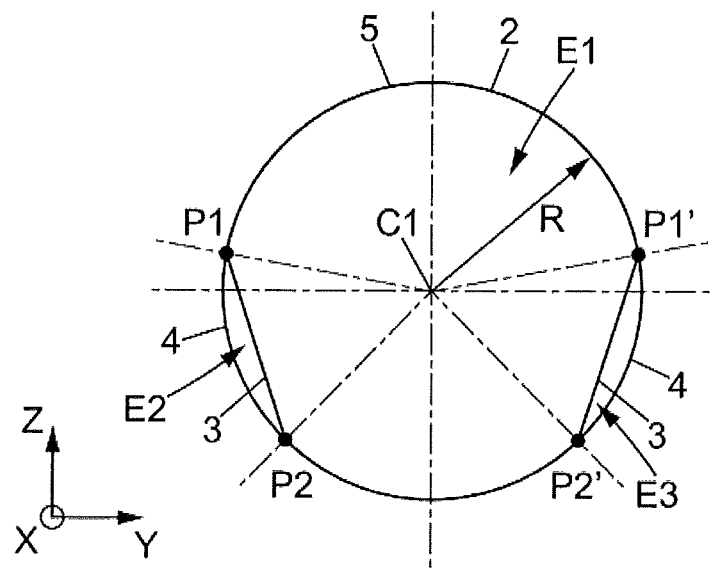
Figure 9:
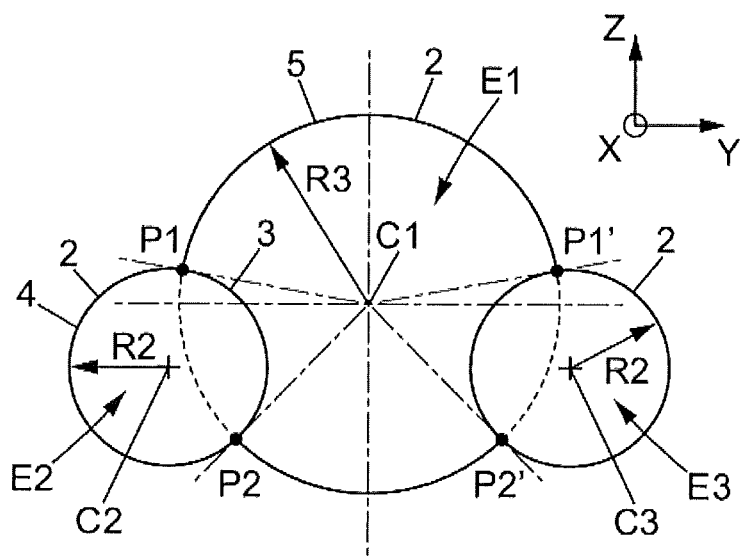

In another embodiment of the invention presented in FIGS. 8 and 9, the first and second points P1, P2 are not placed symmetrically relative to the horizontal plane XY. These points are for example positioned lower on the transverse perimeter of the envelope 2.

Here, the second and third spaces E2, E3 extend laterally downward (in a median direction of points P1 and P2), in the second state of operation of FIG. 9. The airship 1 can maintain an overall height which is greatly reduced in this second state, while having a different aerodynamic behavior in flight. This configuration increases lift during flight (when the airship is advancing).

In the first embodiment presented in FIGS. 1 to 7, the second and third spaces are symmetrical to each other relative to a vertical plane XZ.

In this manner, the airship 1 remains symmetrical relative to this vertical plane XZ in the second state of operation of FIG. 3 (inflated).

In another embodiment not represented in the figures, the airship 1 comprise multiple walls 3 in order to create a plurality of additional spaces, these spaces being supplied with second gas by one or more pumping devices.

In yet another embodiment not represented in the figures, the invention does not exclude the use of air ballonets located inside the first space E1, for pressurizing this first space. These ballonets do not have to interact with the outside envelope 2 of the airship 1.

With this combination, the variation in volume may be even larger. For example, the air ballonets inside the first space allow a variation in volume of 30%. In the case of the embodiment of FIGS. 2 and 3, this combination provides a variation of 30%+14%=44% of the volume of first gas. This allows the airship to maneuver within an even larger range of altitudes.

Conversely, the air ballonets of the airship may be reduced in volume. For example, they can provide a variation in volume of 30%−14%=16%. Such an airship does not have a greater range of altitudes, but it can change its shape which allows other maneuvers during flight.

With this combination, the additional spaces of the invention (second and third spaces E2, E3) and the air ballonets, it is also possible to have a variation in volume that is substantially independent of the variation in shape.

In this manner, it is possible to fly the airship 1 in a predetermined shape, the first shape, the second shape, or any intermediate shape between the first and second shape, over at least an extended range of altitudes.

For example, it is possible to fly the airship in the second shape over a range of altitudes in order to benefit from reduced drag and a greater maximum travel speed of the airship. One will also note that the second shape of the envelope provides a dynamic lift effect when the airship is advancing, an effect of the same type as the lift generated by an airplane wing.

In addition, the airship 1 may comprise a front ballonet located near the nose 2*a* and a rear ballonet located near the tail 2*b*, in a manner known to assist with flight maneuvers and in particular with raising or lowering the nose of the airship.

In one embodiment of the invention, the second gas is identical to the first gas. This means that the gas contained in the second and third spaces E2, E3 is, for example, helium or hydrogen.

The pumping device is connected to the first space E1 and to the second space E2 in order to extract an amount of the first gas from the first space to inject it into the second space in order to inflate the second space, or conversely in order to deflate the second space.

The lighter-than-air first gas is in a volume comprising the set of first and second spaces (and the third space if applicable).

The volume occupied by this first gas can be varied over wide ranges of variation, as was demonstrated above.

It is then possible for the pumping device to be integrated into the wall 3, inside the envelope 2 of the airship, which simplifies construction.

Leakage of the first gas is thus limited, because it remains confined within the outside envelope 2 of the airship.

In another embodiment of the invention, the second gas is different from the first gas. In particular, the second gas can be air brought in from outside the airship 1 by the pumping device.

The pumping device is connected to the outside of the envelope and to the second space in order to pump a quantity of the second gas from outside the envelope and inject it into the second space in order to inflate the second space, or conversely in order to deflate the second space.

The volume occupied by the first gas is solely the volume of the first space E1.

It is then possible for the pumping device to be integrated into the portion 4 of the envelope 2, which simplifies construction. For example, the pumping device is one or more fans.

In one embodiment of the invention, the airship additionally comprises an input selector for the pumping device, and the gas injected into the second space is selectable by the pilot or by a control device. For example, the outside air or the first gas contained in the first space can be injected into the second space.

The airship 1 is then even more freely configurable.

It is possible for the pumping device to be located in the gondola 10 of the airship. It is then connected to the second space E2 (or respectively the third space E3) and possibly to the first space E1, by pipes which carry the second gas between the pumping device and said second space E2 (respectively E3).

In the various embodiments of the invention, the envelope 2 of the airship is a "flexible" envelope. Air flows all around the flexible envelope of the airship 1. The envelope 2 comprises a flexible surface in contact with the flow of the air in which the airship 1 is intended to fly. The envelope 2 has no rigid internal structure, and is not covered with a rigid external structure, at least for a large portion of the outside surface of the flexible envelope 2: for example at least 80% of this surface area is in contact with the flow of air.

What is claimed is:

1. An airship, comprising:
    a flexible envelope without a rigid internal structure imposing a shape on the envelope, said envelope delimiting an inside space intended to be at least partially filled with a lighter-than-air first gas, extending along a longitudinal axis between a nose located at the front of the airship and a tail located at the back of the airship, and comprising an upper portion located at the top and a lower portion located at the bottom, said lower portion being opposite the upper portion,
    a wall located inside the envelope, said wall being flexible, being gas-tight, extending longitudinally between the nose and the tail thus separating the inside space of the envelope into a first space intended to be filled with said first gas and a second space intended to be filled with a second gas, said second space being located on the periphery of the envelope between a first point and a second point of a perimeter within a plane perpendicular to the longitudinal axis, and a pumping device adapted for inflating the second space to a control pressure greater than a pressure of the first space so that the envelope assumes a second shape by bringing the first and second points closer together, and for deflating the second space to a control pressure substantially equal to the pressure of the first space so that the envelope assumes a first shape that is different from the second shape, and wherein:

the second space is delimited between a portion of the envelope and the wall, and the wall has a curvilinear length less than or equal to a curvilinear length of the portion of the envelope, in the plane perpendicular to the longitudinal axis.

2. Airship according to claim 1, wherein the first shape of the envelope has a cross-section in a plane transverse to the longitudinal axis which is circular, and the second shape of the envelope has a cross-section in this same transverse plane which comprises at least two lobes.

3. Airship according to claim 1, wherein the wall has a curvilinear length in a plane perpendicular to the longitudinal axis which is equal to a distance between the first and second points of said envelope when the second space is deflated, and at a control pressure identical to the pressure of the first space.

4. Airship according to claim 1, wherein the first and second points and the center of the envelope when the second space is deflated form an angle which is between 60 degrees and 100 degrees.

5. Airship according to claim 1, wherein said wall is a first wall, and further comprising a second wall, both walls located inside the envelope, said walls being flexible, being gas-tight, extending longitudinally between the nose and the tail thus separating the inside space of the envelope into a first space intended to be filled with said first gas, and second and third spaces intended to be filled with a second gas, said first space being located between the second and third spaces, and said walls being placed symmetrically to each other relative to a vertical plane comprising the longitudinal axis when said second and third spaces are deflated.

6. Airship according to claim 1, additionally comprising at least one internal ballonet inflated with air and adapted for pressurizing the first space, said internal ballonet being located inside the first space and not interacting with the envelope.

7. Airship according to claim 1, wherein the pumping device is connected to the first space and to the second space in order to extract a quantity of the first gas from the first space to inject it into the second space in order to inflate the second space, or conversely in order to deflate the second space.

8. Airship according to claim 7, wherein the pumping device is integrated into the wall inside the envelope of the airship.

9. Airship according to claim 1, wherein the pumping device is connected to the outside of the envelope and to the second space in order to pump a quantity of the second gas from outside the envelope and inject it into the second space in order to inflate the second space, or conversely in order to deflate the second space.

* * * * *